Patented Oct. 9, 1945

2,386,599

UNITED STATES PATENT OFFICE 2,386,599

AZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application April 22, 1943, Serial No. 484,079

10 Claims. (Cl. 260—155)

This invention or discovery relates to new azo compounds and their application to the art of dyeing or coloring. Textile materials such as organic derivatives of cellulose, wool, silk, nylon and lacquers composed of cellulose esters and cellulose ethers, for example, can be colored. Coloration can be effected by dyeing, printing, stenciling or other suitable methods.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention or discovery will be illustrated more particularly in connection with the coloration of cellulose acetate, a material to which the invention or discovery is especially adapted, it will be understood that it applies equally to the coloration of the other materials just mentioned.

It is an object of our invention or discovery to provide a new class of azo compounds. Another object is to provide a process for the dyeing or coloration of various textile materials including organic derivative of cellulose, wool, silk and nylon textile materials. A further object is to provide dyed textile materials which are of good fastness to light and washing and which can be readily discharged to a pure white. A still further object is to provide dye compounds having improved dyeing properties as regards levelness and speed of dyeing at relatively low temperatures. A further object is to provide a satisfactory process for the preparation of the azo compounds of our invention or discovery. Other objects will appear hereinafter.

The azo compounds of our invention or discovery by means of which the above objects are accomplished or made possible consist of the azo compounds having the formula:

R—N=N—R₁ wherein R represents the residue of a member selected from the group consisting of a benzene nucleus, a naphthalene nucleus and an azeobenzene nucleus and R₁ represents the residue of a coupling component and wherein at least one of the members R and R₁ contains a 4,5-dihydroxyamyl group joined directly to the nucleus through a nitrogen atom.

While our invention or discovery relates broadly to the azo compounds having the above formula, it relates more particularly to the azo compounds having the formula:

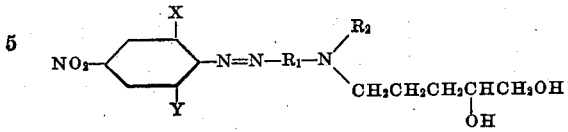

wherein X represents a member selected from the group consisting of hydrogen, a hydroxy group, an alkoxy group, an alkyl group, a cyano group, a halogen atom, a nitro group, a sulfonealkylamide group, a sulfonealkoxyalkylamide group, a sulfonehydroxyalkylamide group, and an alkylsulfone group, Y stands for a member selected from the group consisting of hydrogen and a halogen atom and wherein when X is a nitro group Y can also be a member selected from the group consisting of a cyano group, a sulfonealkylamide group, a sulfonealkoxyalkylamide group, a sulfonehydroxyalkylamide group, and an alkylsulfone group, R₁ stands for the residue of a benzene nucleus and R₂ stands for a member selected from the group consisting of hydrogen, an alkyl group, an alkoxyalkyl group, a hydroxyalkyl group, and an unsaturated open chain hydrocarbon group whose unsaturation consists of a double bond.

The azo compounds of our invention or discovery constitute valuable dyes for the coloration of materials hereinbefore named especially for the coloration of cellulose acetate and nylon. For the coloration of organic derivative of cellulose textile materials, nuclear non-sulfonated compounds should be employed and it is to such compounds that our invention or discovery is more particularly directed. These compounds likewise can be used to color the other materials named herein. Nuclear sulfonated compounds of the invention or discovery which can be prepared by sulfonation of the unsulfonated compounds or by the use of sulfonated intermediates possess little or no utility for the coloration of organic derivative of cellulose textile materials but can be used to color wool and silk.

The azo dye compounds of our invention or discovery possess good affinity for the fiber and in many cases dye cellulose acetate, for example, more rapidly than the corresponding dye compounds containing a group such as β-hydroxyethyl, for example, other than 4,5-dihydroxyamyl. Further, in many instances the dye compounds of the present invention or discovery are more light fast than the corresponding dyes not containing a 4,5-dihydroxyamyl group. Also, as well known in the art, it is difficult to prepare azo dyes yielding dischargeable violet, purple, and blue shades on organic derivative of cellulose which dye rapidly and give deep shades at 70–80° C. The dye compounds of our invention or discovery help to fill this need in the dyeing art, while at the same time, because the 4,5-dihydroxyamyl group causes a shift in color to the blue, they yield shades that are bluer and deeper than any of those hitherto known to the art from corresponding dye compounds containing a group other than the 4,5-dihydroxyamyl group. Many other shades in addition to those just named, of course, are obtainable using the dye compounds described herein.

The azo compounds of our invention or discovery can be prepared by diazotizing an aminobenzene, an aminonaphthalene, or an aminoazobenzene compound and coupling the diazonium compound obtained with a coupling component containing the 4,5-dihydroxyamyl group joined directly thereto through a nitrogen atom. Also, the 4,5-dihydroxyamyl group can be introduced into the dye molecule after formation of an azo compound. To illustrate, 4'-nitrobenzene-4-aminobenzene can be converted to 4'-nitrobenzeneazo-4-mono-(4,5-dihydroxyamyl)-amino-benzene. Ordinarily, this latter procedure is not employed.

The 4,5-dihydroxyamyl group present in the azo compounds of our invention can be joined directly to the dye molecule through a nitrogen atom which is either a nuclear substituent or a part of the dye nucleus. Thus aniline and naphthylamine coupling components, the amino group of which contains a 4,5-dihydroxylamyl group, or heterocyclic coupling components such as 1,2,3,4-tetrahydroquinoline, benzomorpholine, benzothiomorpholine, 2,3-dihydrobenzopyrazole, indole and indoline, the nuclear nitrogen atom of which contains a 4,5-dihydroxyamyl group can be employed in the preparation of the azo compounds of the invention.

The term "alkyl" as used herein and in the claims refers to unsubstituted alkyl groups such as, for example, the methyl group, the ethyl group, a propyl group or a butyl group. By "hydroxyalkyl" is meant groups, for example, such as β-hydroxyethyl, β-hydroxypropyl, β,γ-dihydroxypropyl, γ-hydroxypropyl, δ-hydroxybutyl, 5-hydroxyamyl and 4,5-dihydroxyamyl. By "alkoxyalkyl" is meant groups, for example, such as β-methoxyethyl, β-ethoxyethyl, γ-methoxypropyl, δ-methoxybutyl and β-ethoxy-β-ethoxyethyl. The term "alkoxy" is intended to include groups such as methoxy, ethoxy, propoxy, butoxy, β-hydroxyethoxy and β-ethoxyethoxy. Typical of the "unsaturated open chain hydrocarbon groups whose unsaturation consists of a double bond" may be mentioned $$-CH_2CH=CH_2, -CH_2C=CH_2, -CH_2CH_2CH=CH_2$$
$$\qquad\qquad\qquad\quad \overset{|}{CH_3}$$

and
$$-CH_2CH=CHCH_3$$

The following examples illustrate the preparation of the azo compounds of our invention or discovery. The diazotization and coupling reactions involved in the preparation of the azo compounds involve no techniques not well known to those skilled in the art.

Example 1

.1 gram mole of 1-amino-2-hydroxy-4-nitrobenzene is diazotized in the usual manner and the resulting cyclic diazo compound is recovered by filtration and washed with water.

.1 gram mole of 1-(β-hydroxyethyl-, 4,5-dihydroxyamyl-) amino-3-methylbenzene is dissolved in an acetic acid solution and the resulting solution is cooled to a temperature of about 10° C. The diazonium compound formed as described above is then added with stirring while maintaining the reaction mixture in a cooled condition. Upon completion of the coupling reaction which takes place, the reaction mixture is poured onto ice and water and the precipitated dye compound is recovered by filtration, washed with water and dried. It has the formula:

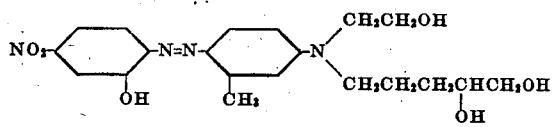

and colors cellulose acetate bright magneta shades which are very fast to light. This dye likewise colors the other materials named herein a generally similar color.

Example 2

.1 gram mole of 1-amino-4-nitrobenzene-6-sulfone-mono-β-methoxyethylamide is diazotized in known fashion and the diazonium compound obtained is added to a solution of .1 gram mole of 1-4,5-dihydroxyamylamino-5-hydroxynaphthalene in dilute hydrochloric acid. Throughout the coupling reaction which takes place the reaction mixture is maintained at a temperature of about 0–10° C. Following the addition of the diazonium solution, the reaction mixture is permitted to stand for awhile after which it is slowly made neutral to Congo red paper by the addition of sodium acetate whereby the coupling reaction is completed. The dye compound is then recovered by filtration, washed with water and dried. It has the formula:

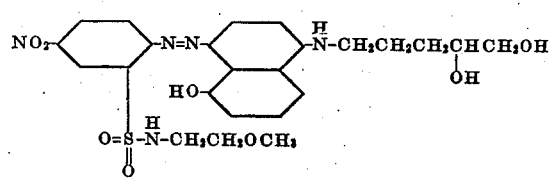

and colors cellulose acetate greenish-blue. The other materials named herein are likewise colored a generally similar shade.

Example 3

.1 gram mole of 1-amino-2,4-dinitro-6-monoethylsulfoneamide is diazotized in known fashion and the diazonium compound obtained is coupled in a cold acetic acid solution with .1 gram mole of N-4,5-dihydroxyamyl-2,7-dimethyl-1,2,3,4-tetrahydroquinoline. The desired dye compound is precipitated by pouring the reaction mixture onto a mixture of ice and water and recovered by filtration following which it is washed with water and dried. The dye compound obtained has the formula:

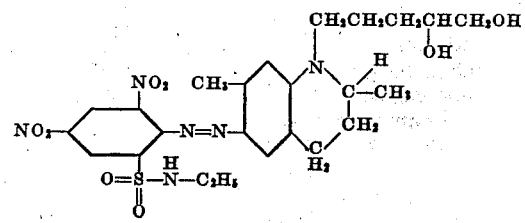

and colors cellulose acetate blue. Generally similar colorations are obtained on the other materials indicated herein.

EXAMPLE 4

.1 gram mole of p-nitroaniline is diazotized and the diazonium compound obtained is added to a cold dilute hydrochloric acid solution of .1 gram mole of 1-4,5-dihydroxyamylamino-2-chlorobenzene. The coupling reaction which takes place is completed by adding sodium acetate until the reaction mixture is just neutral to Congo red paper. The dye compound formed is recovered by filtration, washed with water and dried. It has the formula:

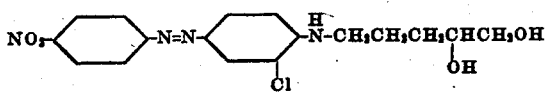

and colors cellulose acetate bright orange shades. Generally similar shades are likewise obtained on the other materials indicated herein.

An equivalent gram molecular weight of 1-(allyl-4,5-dihydroxyamyl-)amino - 3 - chlorobenzene can be substituted for the coupling component of the example to obtain a dye which yields orange shades on the materials indicated hereinbefore.

EXAMPLE 5

.1 gram mole of p-aminoacetophenone is diazotized and the diazonium compound obtained is coupled with .1 gram mole of 1-bis-4,5-dihydroxyamylamino - 3 - methylbenzene. The dye compound obtained colors cellulose acetate orange shades.

EXAMPLE 6

.1 gram mole of 1-amino-2-fluoro-4-nitrobenzene and the diazonium compound obtained is coupled with .1 gram mole of N-4,5-dihydroxyamyl-1,2,3,4-tetrahydroquinoline. The dye compound obtained has the formula:

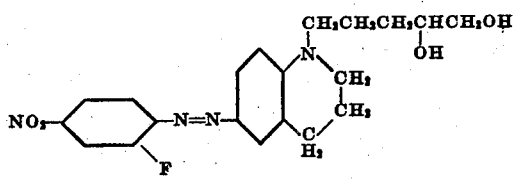

and colors cellulose acetate deep bluish-red shades.

EXAMPLE 7

.1 gram mole of 1-amino-2-hydroxy-4-nitrobenzene is diazotized and the diazonium compound obtained is coupled with .1 gram mole of N-4,5-dihydroxyamylbenzomorpholine. The dye compound obtained has the formula:

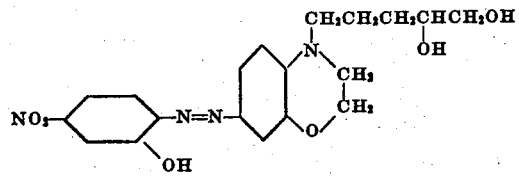

and colors cellulose acetate pinkish-red shades.

EXAMPLE 8

.1 gram mole of diazotized 2,4-dinitroaniline is coupled with .1 gram mole of 1-4,5-dihydroxy- amylamino - 5 - hydroxynaphthalene. The dye compound obtained has the formula:

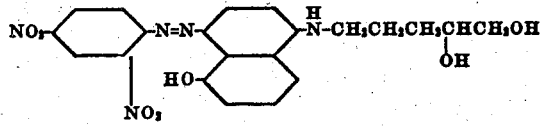

and colors cellulose acetate greenish-blue shades. If 1-4,5 - dihydroxyamylamino - 2 - methoxy-5-methylbenzene is used as the coupling component in this example, the dye compound obtained colors cellulose acetate a violet shade.

EXAMPLE 9

.1 gram mole of diazotized 1-amino-2,4-dinitro-6-chlorobenzene is coupled with .1 gram mole of 1-4,5-dihydroxyamylamino-naphthalene. The dye compound obtained colors cellulose acetate blue shades.

EXAMPLE 10

.1 gram mole of diazotized 1-amino-2,4-dinitrobenzene-6-monoethylsulfoneamide is coupled with .1 gram mole of N-4,5-dihydroxyamyl-7-methyltetrahydroquinoline. The dye compound obtained has the formula:

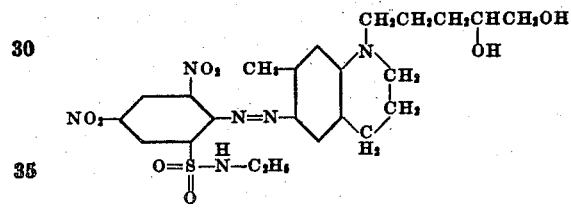

and colors cellulose acetate deep blue shades.

EXAMPLE 11

.1 gram mole of diazotized p-aminoazobenzene is coupled with .1 gram mole of 1-(β,γ-dihydroxypropyl-, 4,5-dihydroxyamyl-)amino - 3-methoxybenzene. The dye compound obtained has the formula:

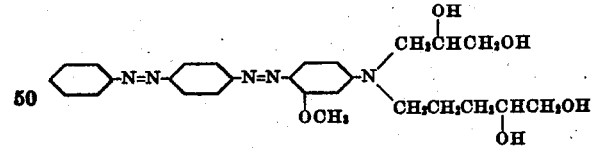

and colors cellulose acetate red shades.

EXAMPLE 12

.1 gram mole of the azo compound 4'-nitrobenzeneazo - (1,1') -4-bis-4,5-dihydroxyamylaminobenzene is dissolved in 4 liters of methanol and is reduced under reflux with 4 gram moles of sodium sulfide. After 3 hours the nitro group is reduced to an amino group and the dye compound resulting is recovered by adding water to the reaction mixture and filtering. The precipitated dye is washed with water and dried. It colors cellulose acetate orange-yellow shades. This dye can be applied to the textile fabrics indicated hereinbefore and when diazotized and developed on fiber with 2-hydroxy-3-naphthoic acid gives valuable black shades.

EXAMPLE 13

.1 gram mole of diazotized p-nitroaniline is coupled with .1 gram mole of N-4,5-dihydroxyamyl-2-methylbenzothiomorpholine. The dye compound obtained has the formula:

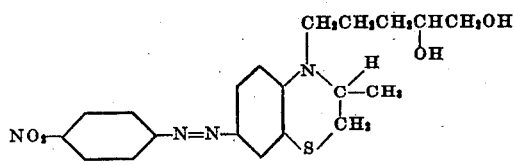

and colors the textile materials indicated hereinbefore red shades.

EXAMPLE 14

.1 gram mole of diazotized α-aminonaphthalene is coupled with .1 gram mole of 4,5-dihydroxyamylaniline. The dye compound obtained colors organic derivatives of cellulose, wool, silk and nylon yellowish-orange shades.

EXAMPLE 15

.1 gram mole of diazotized 2-amino-5-nitrobenzenesulfonic acid is coupled with .1 gram mole of (ethyl-, 4,5-dihydroxyamyl)-aminobenzene. The dye compound obtained colors wool and silk rubine shades.

EXAMPLE 16

.1 gram mole of diazotized 3-chloro-4-aminobenzenesulfonic acid is coupled with .1 gram mole of 1-4,5-dihydroxyamylamino-5-hydroxynaphthalene. The dye compound obtained colors wool and silk orange shades.

EXAMPLE 17

.1 gram mole of diazotized 1-naphthylamine-5-sulfonic acid is coupled with .1 gram mole of 1-4,5-dihydroxyamylamino-3-methylbenzene. The dye compound obtained colors wool and silk orange shades.

EXAMPLE 18

.1 gram mole of diazotized p-aminoacetophenone is coupled with .1 gram mole of 1-4,5-dihydroxydihydrobenzopyrazole. The dye compound obtained has the formula:

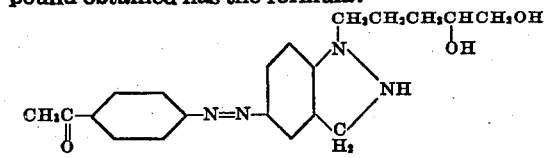

It colors organic derivatives of cellulose, wool, silk and nylon orange shades.

EXAMPLE 19

.1 gram mole of diazotized p-nitroaniline is coupled with .1 gram mole of 1-4,5-dihydroxyamyl-6-methylindoline. The dye compound obtained has the formula:

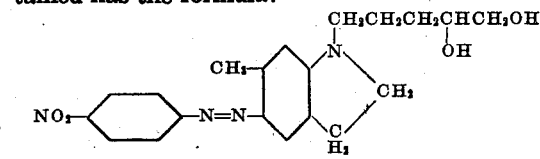

It colors organic derivatives of cellulose, wool, silk and nylon rubine shades.

The following tabulation further illustrates the compounds included within the scope of our invention or discovery together with the color they yield on cellulose acetate. Generally similar shades are produced on the other textile material indicated hereinbefore. The compounds indicated below may be prepared by diazotizing the amines listed under the heading "Amine" and coupling the diazonium compounds obtained with the compounds specified in the column entitled "Coupling Component."

| Amine | Coupling component | Color |
|---|---|---|
| p-Aminoacetophenone | (1) 1-(β,γ-dihydroxypropyl-, 4,5-dihydroxyamyl-)amino-3-chlorobenzene. | Yellowish-orange. |
| Do | (2) (4,5-dihydroxyamyl-, β-hydroxyethyl-)aminobenzene. | Orange. |
| Do | (3) N-4,5-dihydroxyamyldiphenylamine. | Do. |
| Do | (4) (Ethyl-, 4,5-dihydroxyamyl-)aminobenzene. | Do. |
| Do | (5) (β-hydroxypropyl-, 4,5-dihydroxyamyl-)amino-2-methoxybenzene. | Do. |
| Do | (6) (Allyl-, 4,5-dihydroxyamyl-)amino-2-methoxy-5-methylbenzene. | Orange-red. |
| Do | (7) (β-methoxyethyl-, 4,5-dihydroxyamyl-) amino-2,5-dimethoxybenzene. | Do. |
| Do | (8) (β-sulfatoethyl-, 4,5-dihydroxyamyl-) amino-2-methoxy-5-methylbenzene. | Do. |
| Do | (9) 1-(β-sulfoethyl-, 4,5-dihydroxyamyl-) aminonaphthalene. | Red. |
| p-Aminophenyl-methylsulfone | 1-9 above | Orange to violet. |
| p-Nitroaniline | do | Orange to blue. |
| 1-amino-2-chloro-4-nitrobenzene | do | Do. |
| 1-amino-2,4-dinitro-6-chlorobenzene | do | Rubine to blue-green. |
| 2-amino-3,5-dinitrophenylmonoethylsulfonamide | do | Do. |
| 1-amino-2,4-dinitro-6-hydroxybenzene | do | Do. |
| α-naphthylamine | do | Orange to violet. |
| p-Nitroaniline | (10) Bis-4,5-dihydroxyamylamino-3-chlorobenzene. | Orange. |
| Do | (11) Bis-4,5-dihydroxyamylaniline. | Orange-red. |
| Do | (12) Bis-4,5-dihydroxyamylamino-3-methoxybenzene. | Red. |
| Do | (13) Bis-4,5-dihydroxyamyl-2-methoxy-5-chlorobenzene. | Do. |
| Do | (14) Bis-4,5-dihydroxyamylamino-2-methoxy-5-methylbenzene. | Rubine. |
| Do | (15) Bis-4,5-dihydroxyamylamino-2,5-dimethoxybenzene. | Do. |
| Do | (16) 1-bis-4,5-dihydroxyamylaminonaphthalene. | Do. |
| Do | (17) 1-bis-4,5-dihydroxyamylamino-5-hydroxynaphthalene. | Blue. |
| 1-amino-2-chloro-4-nitrobenzene | 10-17 above | Orange to blue. |
| 4'-nitrobenzeneazo-4-aminobenzene | do | Do. |
| 1-amino-2-hydroxy-4-nitrobenzene | do | Do. |
| 1-amino-2,4-dinitro-6-bromobenzene | do | Rubine to blue-green. |
| 1-amino-2,4-dinitro-6-cyanobenzene | do | Do. |
| 1-amino-4-nitro-2,6-dichlorobenzene | do | Brownish-red to blue. |
| p-Aminoacetophenone | (18) 4,5-dihydroxyamylamino-2-chlorobenzene. | Orange-yellow. |
| Do | (19) 4,5-dihydroxyamylamino-2-fluorobenzene. | Do. |
| Do | (20) 4,5-dihydroxyamylamino-2-methylbenzene. | Yellowish-orange. |
| Do | (21) 4,5-dihydroxyamylamino-2-methoxybenzene. | Orange. |
| Do | (22) 1-4,5-dihydroxyamylamino-2-methoxy-5-acetylaminobenzene. | Rubine. |
| Do | (23) 1-4,5-dihydroxyamylamino-5-hydroxynaphthalene. | Do. |
| Do | (24) 1-4,5-dihydroxyamylamino-5-acetylaminonaphthalene. | Do. |

| Amine | Coupling component | Color |
|---|---|---|
| p-Aminophenylmethylsulfone | 18-24 above | Orange to violet. |
| o-Aminophenylmethylsulfone | do | Do. |
| p-Aminoazobenzene | do | Orange to red-blue. |
| o-Nitroaniline | do | Orange to violet. |
| 1-amino-2-methyl-4-nitrobenzene | do | Orange to blue. |
| 1-amino-2-ethoxy-4-nitrobenzene | do | Do. |
| 2-amino-5-nitrophenylmethylsulfone | do | Orange to blue-green. |
| 2-amino-5-nitrophenylmethylketone | do | Do. |
| 1-amino-2-cyano-4-nitrobenzene | do | Do. |
| p-Aminoacetophenone | (25) N-4,5-dihydroxyamyl-2-methyl-1,2,3,4-tetrahydroquinoline. | Orange. |
| Do | (26) N-4,5-dihydoxyamylbenzomorpholine | Do. |
| Do | (27) N-4,5-dihydroxyamyl-2-methylbenzomorpholine | Do. |
| Do | (28) N-4,5-dihydroxyamyl-2-methylbenzothiomorpholine. | Do. |
| Do | (29) 1-4,5-dihydroxyamyldihydrobenzopyrazole | Do. |
| Do | (30) N-4,5-dihydroxyamyl-7-methyl-1,2,3,4-tetrahydroquinoline. | Red. |
| Do | (31) N-4,5-dihydroxyamyl-7-methylbenzomorpholine | Do. |
| Do | (32) N-4,5-dihydroxyamyl-6-methylindoline | Do. |
| Do | (33) N-4,5-dihydroxyamyl-7-acetylamino-1,2,3,4-tetrahydroquinoline. | Rubine. |
| Do | (34) N-4,5-dihydroxyamyl-7-acetylaminobenzomorpholine. | Do. |
| Do | (35) N-4,5-dihydroxyamyl-5-acetylaminobenzomorpholine. | Do. |
| Do | (36) N-4,5-dihydroxyamyl-5-acetylamino-1,2,3,4-tetrahydroquinoline. | Do. |
| p-Nitroaniline | 25-36 above | Red to rubine. |
| 2-amino-5-nitrophenylmethylsulfone | do | Red to violet. |
| 1-amino-2,4-dinitro-6-chlorobenzene | do | Red-blue. |
| 2-amino-3,5-dinitrophenylethylsulfone | do | Greenish-blue. |
| 3'-nitrobenzeneazo-4-aminobenzene | do | Rubine. |
| 1-amino-2,4-dinitronaphthalene | do | Blue. |
| 1-amino-4-nitrobenzene-6-mono-β-methoxyethylsulfoneamide. | 1-9 above | Rubine to violet. |
| Do | 10-17 above | Do. |
| Do | 18-24 above | Do. |
| Do | 25-36 above | Do. |
| 1-amino-2,4-dinitrobenzene-6-mono-β-methoxy-ethyl-sulfoneamide. | 1-9 above | Rubine to blue-green. |
| Do | 10-17 above | Do. |
| Do | 18-24 above | Do. |
| Do | 25-36 above | Blue to blue-green. |
| 1-amino-4-nitrobenzene-6-mono-β-hydroxyethylsulfoneamide. | 1-9 above | Red to blue-green. |
| Do | 10-17 above | Do. |
| 1-amino-2,4-dinitrobenzene-6-mono-β-hydroxyethyl-sulfoneamide. | 18-24 above | Do. |

It will be understood that the foregoing examples are intended to be illustrative and not limitative of our invention or discovery. The diazonium compounds of any of the amines indicated herein can be coupled, for example, with any of the coupling components indicated herein to yield dye compounds of the invention or discovery. Additional amines that can be diazotized and employed in the preparation of the dye compounds include, for example, o-chloroaniline, m-sulfanilic acid, p-sulfanilic acid, 4-amino-5-nitrobenzenesulfonic acid, 2-amino-5-bromobenzenesulfonic acid, 3-amino-4-hydroxy-6-chlorobenzenesulfonic acid, 3-amino-4-hydroxy-5-chlorobenzenesulfonic acid, 3-amino-4-hydroxy-6-methylbenzenesulfonic acid, 1-amino-2,4-dinitro-6-hydroxybenzene, 1-amino-2-naphthol-4-sulfonic acid, 2-amino-5-naphthol-4-sulfonic acid, 1-naphthylamine-6,8-disulfonic acid, 4-amino-4'-nitroazobenzene, 4-amino-4'-sulfoazobenzene and 4-amino-2'-chloro-4'-nitroazobenzene.

In order that the preparation of the azo compounds of our invention or discovery may be entirely clear, the preparation of the 4,5-dihydroxyamyl intermediates employed in their manufacture is indicated hereinafter. These compounds can be prepared by reacting the coupling components of the character indicated hereinbefore, minus the 4,5-dihydroxyamyl group, with the diacetate of 1-chloro-4,5-dihydroxy-n-pentane, that is, 1-chloropentane-4,5-diol diacetate having the formula:

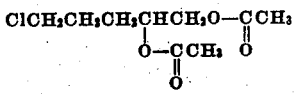

separating the compound formed and hydrolyzing it to the desired 4,5-dihydroxyamyl intermediate. Thus, aminobenzene, aminonaphthalene, 1,2,3,4-tetrahydroquinoline, benzomorpholine, benzothiomorpholine, diphenylamine, dihydrobenzopyrazole and indoline compounds containing a replaceable hydrogen atom on the nitrogen atom, for example, can be so treated to introduce a 4,5-dihydroxyamyl group which is directly attached to the nitrogen atom. In the case of those compounds containing a nitrogen atom having two replaceable hydrogen atoms, two 4,5-dihydroxyamyl groups can be prepared.

The diacetate of 1-chloro-4,5-dihydroxy-n-pentane (chlorodiacetate 1,4,5-pentane) can be prepared as described in Comptes rendus, vol. 211, page 645 (1940). This compound can also be obtained in substantially pure form by the following procedure:

204 grams of tetrahydrofurfuryl alcohol, 500 grams of acetyl chloride and a few milligrams of zinc chloride are placed in a suitable reaction vessel and subjected to a refluxing operation for one hour. The reaction mixture is then distilled under reduced pressure and the fraction coming off at 157° C.–158° C./20 mm. is separately recovered. The run was repeated. 656 grams of the fraction distilling off at 157° C.–158° C./20 mm. were obtained from the two runs. This fraction consists principally of the diacetate of 1-chloro-4,5-dihydroxy-n-pentane together with a minor amount of the diacetate of 4-chloro-1,5-dihydroxy-n-pentane. A carbon, hydrogen, chlorine analysis gave the following results:

|  | Found | Calculated for 1-chloropentane-4,5-diol diacetate |
|---|---|---|
| C | 47.90 | 48.65 |
| H | 6.85 | 6.75 |
| Cl | 15.58 | 15.97 |

300 grams of the reaction mixture obtained were fractionated in a jacketed, helix packed fractionating column capable of close fractionation with the results tabulated hereinafter.

| Fractions | Boiling point | Grams |
|---|---|---|
| 1 | 85–122/12 mm | 18 |
| 2 | 122–141/12 mm | 28 |
| 3 | 141–148/12 mm | 11 |
| 4 | 148–151/12 mm | 230 |
| Residue |  | 10 |

The fraction boiling at 141–148/12 mm. consists almost entirely of the diacetate of 1-chloro-4,5-dihydroxy-n-pentane (1-chloropentane-4,5-diol diacetate).

Acetyl bromide can be substituted for acetyl chloride and the foregoing procedure carried out to obtain the corresponding bromo compound, that is, the diacetate of 1-bromo-4,5-dihydroxy-n-pentane. This latter compound, if desired, can be substituted for the corresponding chloro compound.

The preparation of the coupling components employed in the manufacture of the azo compounds of our invention or discovery will be clear from the following illustrative examples:

*Preparation of N-4,5-dihydroxyamyl-2-methyl-1,2,3,4-tetrahydroquinoline*

14.7 grams of 2-methyl-1,2,3,4-tetrahydroquinoline, 25.0 grams of 1-chloropentane-4,5-diol diacetate and 63.0 grams of $Na_2CO_3$ are placed together in a suitable reaction vessel and heated with stirring for 5 hours in an oil bath at 200° C. Upon cooling 50 cc. of ethyl alcohol were added to the reaction mixture and the salt formed in the reaction was removed by filtration. The reaction mixture was then distilled. About ⅔ of the mixture was unreacted 2-methyl-1,2,3,4-tetrahydroquinoline and 1-chloropentane-4,5-diol diacetate, which were removed by distillation under reduced pressure. The portion remaining consists essentially of the 4,5-diacetate of N-4,5-dihydroxyamyl-2-methyl-1,2,3,4 - tetrahydroquinoline and is a quite viscous material boiling at 215°–225° C./9 mm.

5 grams of the diacetate of N-4,5-dihydroxyamyl-2-methyl-1,2,3,4-tetrahydroquinoline obtained as above were heated on the steam bath for 3 hours with 30 cc. of 1:6 $H_2SO_4$. The reaction mixture was then made alkaline with $Na_2CO_3$ and extracted with benzene. The benzene extract was then washed with water and the solvent was removed by distillation under reduced pressure leaving N-4,5-dihydroxyamyl-2-methyl-1,2,3,4-tetrahydroquinoline.

*Preparation of 1-(β-hydroxyethyl-, 4,5-dihydroxyamyl-) amino-3-methylbenzene*

15.1 grams of 1-β-hydroxyethylamino-3-methylbenzene, 25.0 grams of 1-chloropentane-4,5-diol diacetate and 63.0 grams of $Na_2CO_3$ are placed together in a suitable reaction vessel and heated with stirring for 5 hours in an oil bath at 180–190° C. Upon cooling, 50 cc. of ethyl alcohol were added to the reaction mixture and the salt formed in the reaction was removed by filtration. The reaction product was then distilled under reduced pressure to remove unreacted 1-chloropentane-4,5-diol diacetate and 1-(β-hydroxyethyl-, 4,5-dihydroxyamyl-)amino-3-methylbenzene. The portion remaining consists essentially of the 4,5-diacetate of 1-(β-hydroxyethyl-, 4,5-dihydroxyamyl-)amino-3-methylbenzene which boils at 238–241° C./4 mm.

The product resulting from the above reaction was then heated to 95–100° C. for about 3 hours with 30 cc. of 10% sulfuric acid. The reaction mixture was then made alkaline by the addition of sodium hydroxide and the oil that separates is extracted with ether. The ether extract was then distilled under reduced pressure, the ether being first removed in this distillation, to obtain a good yield of 1-(β-hydroxyethyl-, 4,5-dihydroxyamyl-)amino-3-methylbenzene which boils at 245–250° C./4 mm.

*Preparation of 1-bis-4,5-dihydroxyamylamino-3-methylbenzene*

.1 gram mole of m-toluidine is heated with stirring in a suitable reaction vessel at 150–180° C. for 6 hours with .25 gram moles of 1-bromopentane-4,5-diol diacetate and 126 grams of $Na_2CO_3$. Upon working up the reaction product in accordance with the procedure described in the examples immediately preceding, 1-bis-4,5-diacetoxyamylamino-3-methylbenzene boiling at 193–199° C./1.5 mm. is obtained. Upon hydrolysis of this product in accordance with the procedure indicated hereinbefore, 1-bis-4,5-dihydroxyamylamino-3-methylbenzene boiling at 196–202° C./2 mm. is obtained.

Additional intermediate compounds that can be prepared in accordance with the procedure described above are tabulated hereinafter:

| Compound | Boiling point |
|---|---|
| 1-4,5-diacetoxyamylaminonaphthalene | 252–257° C./4 mm. |
| 1-4,5-dihydroxyamylaminonaphthalene | 240–250° C./4 mm. |
| 1-4,5-diacetoxyamylamino-2-methoxy-5-methylbenzene | 220–235° C./4 mm. |
| 1-4,5-dihydroxyamylamino-2-methoxy-5-methylbenzene | 194–198° C./3 mm. |
| N-4,5-diacetoxyamyl-7-methyltetrahydroquinoline | 215–218° C./4 mm. |
| N-4,5-dihydroxyamyl-7-methyltetrahydroquinoline | 221–223° C./4 mm. |

From the examples that have been given, the manner of preparation of the coupling components used in the manufacture of the azo dye compounds of our invention or discovery will be apparent since the procedure indicated is applicable to the preparation of all of the various coupling components disclosed herein.

The azo compounds of our invention are, for the most part, relatively insoluble in water and, accordingly, they may be advantageously directly applied to the material undergoing coloration in the form of an aqueous suspension which can be prepared by grinding the dye to a paste in the presence of a sulfonated oil, soap or other suitable dispersing agent and dispersing the resulting paste in water. In some instances, the dye may possess sufficient solubility in water as to render the use of a dispersing agent unnecessary. Generally speaking, however, the use of a dispersing agent is desirable.

Direct dyeing operations can, with advantage, be conducted at temperatures of about 75–85° C. but any suitable temperature may be used. Thus, the textile material to be dyed or colored is ordinarily added to the dyebath at a temperature lower than that at which the main portion of the dyeing is to be effected, a temperature approximating 45-55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1-3% by weight of dye to material is employed although any desired proportions can be used.

Suitable dispersing agents together with the amounts that may be employed are disclosed in our U. S. Patent No. 2,115,030, issued April 26, 1938. The process disclosed in this patent for the dyeing of cellulose acetate can be used in applying the dyes of the present application to this material. While a satisfactory method of dyeing has been disclosed herein, it will be understood that any other suitable methods for dyeing the non-vegetable textile materials named herein can be employed. Lacquers may be colored with the dye compounds of our invention by the methods customarily employed in the lacquer art.

It is here noted that the term "nylon" refers to a linear polyamide resin which is believed to be basically described or claimed in U. S. Letters Patent 2,071,250, issued February 16, 1937, to Wallace H. Carothers.

The fractionation of the reaction mixture resulting from the reaction of tetrahydrofurfuryl alcohol, acetyl chloride and zinc chloride described hereinbefore can be carried out in a highly efficient distillation column (see Whitmore and Lux, Journ. Am. Chem. Soc. 54, 3453 (1932); Fenske, Tongberg and Quiggle, Ind. Eng. Chem. 26, 1169 (1934); Tongberg, Quiggle and Fenske, Ind. Eng. Chem. 26, 1213 (1934) and W. W. Stewart, Ind. Eng. Chem. 28, 451 (1936)). The distillation columns described in the articles referred to can, of course, be used to effect any of the fractionation operations required in connection with the present invention or discovery.

1:6 H₂SO₄ as used herein refers to a mixture of 1 part of concentrated sulfuric acid (94-95% H₂SO₄) and 6 parts of water, the parts being by weight.

We claim:

1. The azo compounds having the formula:

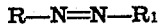

wherein R represents the residue of a member selected from the group consisting of a benzene nucleus, a naphthalene nucleus and an azobenzene nucleus and R₁ represents the residue of a coupling component selected from the group consisting of coupling components of the benzene series, coupling components of the naphthalene series, 5-membered heterocyclic coupling components containing at least one hetero nitrogen atom having a fused-on benzene ring and in which a hetero nitrogen atom is directly attached to the fused-on benzene ring and 6-membered heterocyclic coupling components containing at least one hetero nitrogen atom having a fused-on benzene ring and in which a hetero nitrogen atom is directly attached to the fused-on benzene ring and wherein at least one of the members R and R₁ contains a 4,5-dihydroxylamyl group joined directly to the nucleus through a nitrogen atom.

2. The azo compounds having the formula:

wherein R represents the residue of a member selected from the group consisting of a benzene nucleus, a naphthalene nucleus and an azobenzene nucleus and R₁ represents the residue of a coupling component selected from the group consisting of coupling components of the benzene series, coupling components of the naphthalene series, 5-membered heterocyclic coupling components containing at least one hetero nitrogen atom having a fused-on benzene ring and in which a hetero nitrogen atom is directly attached to the fused-on benzene ring and 6-membered heterocyclic coupling components containing at least one hetero nitrogen atom having a fused-on benzene ring and in which a hetero nitrogen atom is directly attached to the fused-on benzene ring containing a 4,5-dihydroxyamyl group joined directly to its nucleus through a nitrogen atom.

3. The azo compounds having the formula:

wherein R represents the residue of a member selected from the group consisting of a benzene nucleus, a naphthalene nucleus and an azobenzene nucleus and R₁ represents the residue of a benzene coupling component containing a 4,5-dihydroxyamyl group joined directly to its nucleus through a nitrogen atom.

4. The azo compounds having the formula:

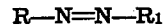

wherein R represents the residue of a benzene nucleus and R₁ represents the residue of a benzene coupling component containing a 4,5-dihydroxyamyl group joined directly to its nucleus through a nitrogen atom.

5. The nuclear non-sulfonated monoazo dye compounds having the formula:

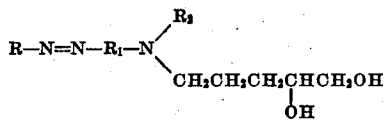

wherein R stands for the residue of a benzene nucleus, R₁ stands for the residue of a benzene nucleus, and R₂ stands for a member selected from the group consisting of hydrogen, an alkyl group, a hydroxyalkyl group, an alkoxyalkyl group, and an unsaturated open chain hydrocarbon group whose unsaturation consists of a double bond.

6. The nuclear non-sulfonated monoazo dye compounds having the formula:

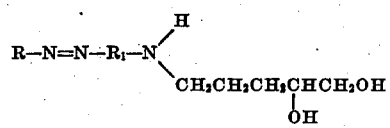

wherein R stands for the residue of a benzene nucleus and R₁ stands for the residue of a benzene nucleus.

7. The nuclear non-sulfonated monoazo dye compounds having the formula:

wherein R stands for the residue of a benzene nucleus and R₁ stands for the residue of a N-4,5-dihydroxyamyl - 1,2,3,4 - tetrahydroquinoline nucleus.

8. The azo dye compound having the formula:
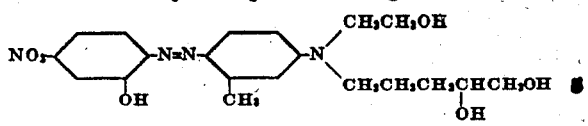
9. The azo dye compound having the formula:
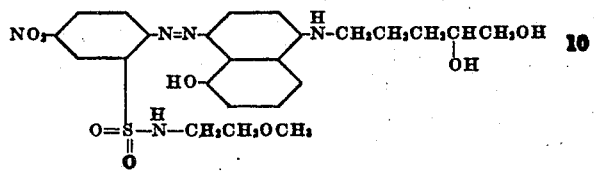
10. The azo dye compound having the formula:
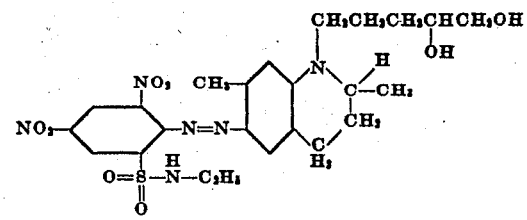
JOSEPH B. DICKEY.
JAMES G. McNALLY.